United States Patent [19]

Mundell

[11] 4,291,077
[45] Sep. 22, 1981

[54] METHOD AND APPARATUS FOR INSTALLING A WHEEL COVER

[76] Inventor: Robert D. Mundell, 221 Penhurst Dr., Pittsburgh, Pa. 15235

[21] Appl. No.: 64,671

[22] Filed: Aug. 8, 1979

[51] Int. Cl.³ .............................................. A41D 13/08
[52] U.S. Cl. ...................................... 428/76; 428/68; 2/20; 2/161 R
[58] Field of Search ................... 2/20, 17, 16, 161 R; 294/25; 301/37 R; 428/68, 70, 76, 402, 404; 272/119; 273/415; 46/158

[56] References Cited

U.S. PATENT DOCUMENTS

| 2,077,202 | 4/1937 | Barrie | 2/20 |
| 2,695,999 | 12/1954 | Arnold | 2/20 |
| 2,952,021 | 9/1960 | Finn | 2/20 |
| 3,628,793 | 12/1971 | Mudloff | 273/415 |

Primary Examiner—George F. Lesmes
Assistant Examiner—Alexander S. Thomas
Attorney, Agent, or Firm—Thomas H. Murray; Clifford A. Poff

[57] ABSTRACT

A casing formed of flexible and durable plastic or leather forms an enclosed compartment having therein a filling of sand or other finely-divided material. The casing is elastically deformable and the sand is redistributed within the compartment to substantially conform to the contoured area of a wheel cover at a site selected to receive an impact force for installing the cover onto a wheel rim of an automobile or the like. The casing defines a force-receiving area approximately corresponding to the size of a human hand. A strap member is used for retaining support of the casing by the human hand.

6 Claims, 4 Drawing Figures

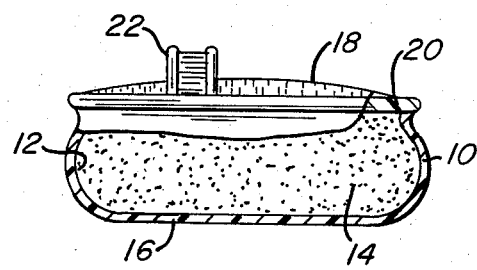
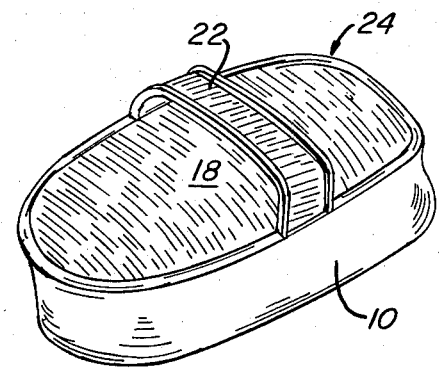
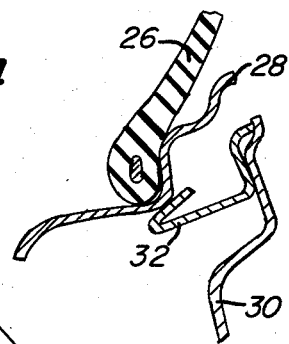
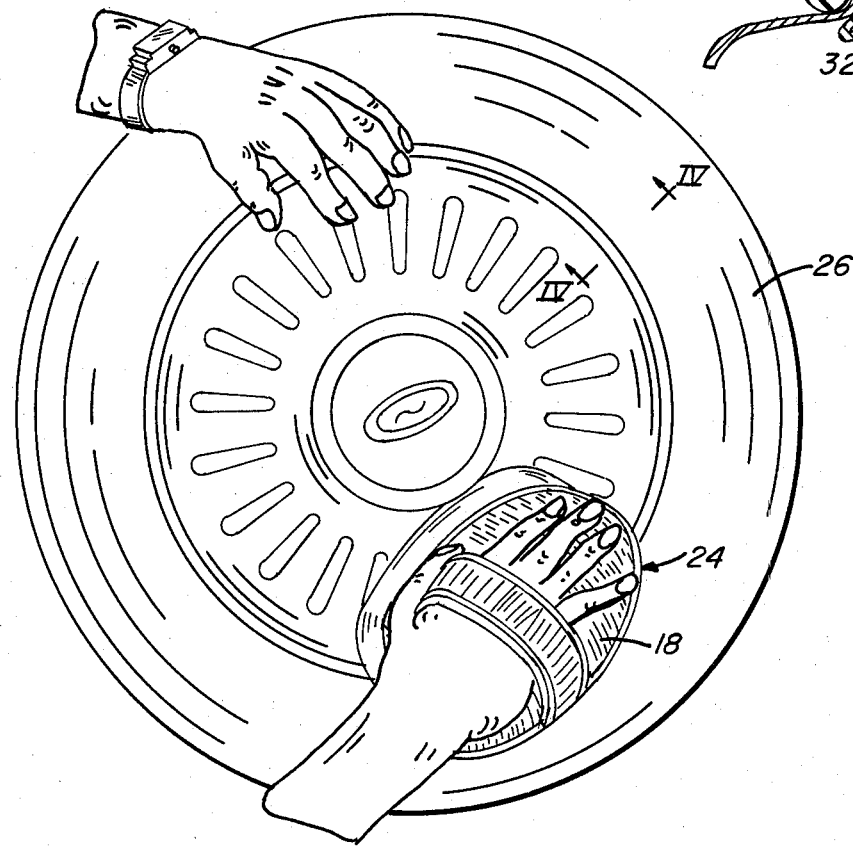

METHOD AND APPARATUS FOR INSTALLING A WHEEL COVER

BACKGROUND OF THE INVENTION

This invention relates to a method and apparatus for the safe and convenient installation of wheel covers, sometimes commonly identified as hub caps, onto a wheel rim for an automobile, trailer, truck or the like. More particularly, the present invention relates to such a method and apparatus wherein a flexible casing is used to form a compartment filled with material which is capable of continuous redistribution within the compartment to substantially conform to the contoured area of the wheel cover while transmitting an impact force to a selected area of the wheel cover, thereby producing an elastic yielding of a friction support surface used for retention of the cover on the wheel rim.

Known conventional methods and implements for installing a wheel cover onto a wheel rim of an automobile or other vehicle have a number of disadvantages and shortcomings. In one traditional method, the installer places the wheel cover into an approximate position wherein the usual spaced-apart resilient gripping surfaces are spaced outwardly from their desired seated position on the rim of the wheel. The operator then strikes the wheel cover with his bare hand, usually the palm portion thereof, in an attempt to impart a sufficient force to the edge portion of the wheel cover to force the spring members into a seated position. The installer frequently bruises or otherwise injures his hand when striking blows against the wheel. This method usually occurs because of a lack of a suitable tool or implement. Known implements include a rubber mallet, a piece of wood, the installer's shoe or other devices which provide a surface for striking a blow against the wheel cover to seat the wheel cover against the rim. These devices are less than adequate for installing a wheel cover because even with great care, a large concentrated force is imposed upon a small surface area of the wheel cover, causing dents or other deformation of the wheel cover. A rubber mallet or similar device has an undamped high elastic modulus so that the mallet rebounces from the wheel cover. Moreover, each spring-gripping surface spaced about the inner peripheral edge of the wheel cover must be moved into a tight-seating engagement with the wheel rim to prevent inadvertent release of the cover from the wheel during the installation process as well as during use of the vehicle, particularly when encountering road hazards, i.e., potholes, etc.

SUMMARY OF THE INVENTION

It is an object of the present invention to provide a method and apparatus for installing a wheel cover onto the rim of a wheel for a vehicle or the like by providing an elastically-deformable casing forming a compartment containing a filling of material which undergoes redistribution within the compartment to substantially conform to the contoured contact area of a wheel cover as an incident to the transmission of an impact force across a selected area of the wheel cover.

It is a still further object of the present invention to provide a method and apparatus to distribute an impact force to a wheel cover incident to the installation thereof onto the rim of a wheel for a vehicle wherein the palm portion of an operator's hand is protected from injury by an impact force distribution member which is conformable to the contoured area of contact with the wheel cover.

More particularly, according to the present invention there is provided apparatus to distribute an impact force along a selected surface area of a wheel cover or the like for installation onto the rim of an automobile wheel, the apparatus including a casing forming an enclosed compartment having therein a filling of material, the casing being sufficiently flexible and durable to undergo elastic deformation accompanied by redistribution of the filling material to substantially conform to a selected part of a contoured surface area of the wheel cover while distributing the impact force across the surface area of the casing brought into contact with the wheel cover, the casing having a force-receiving area which is opposite the area thereof brought into contact with the wheel cover, the force-receiving area being adapted to contact at least the palm portion of the human hand, and means at the force-receiving area of the casing for retaining support by the human hand.

The present invention is further defined by the method of installing a wheel cover or the like onto the rim of a vehicle wheel by elastic deformation of at least one elastically-yieldable friction support surface, the method including the steps of arranging the wheel cover into an approximate installation site therefor at the rim of a vehicle wheel, positioning a flexible casing having a compartment containing a filling of a contour-conforming material in the palm of an operator's hand, and striking the selected area of the wheel cover with the casing under sufficient force to cause elastic yielding of the friction-support surface while permitting the flexible casing and the material in the compartment thereof to conform to the area of impact with the wheel cover.

The material within the compartment of the casing preferably includes a finely-divided substance such as sand. When the casing is operatively arranged in the palm portion of a human hand, the casing encloses a surface area substantially corresponding to the palm and forefinger area of the human hand. The aforesaid force-receiving area of the casing is shaped ellipsoidally.

These features and advantages of the present invention as well as others will be more fully understood when the following description is read in light of the accompanying drawings, in which:

FIG. 1 is an isometric view of the preferred form of the apparatus which is also employed in the method according to the present invention;

FIG. 2 is an end elevational view, partly in section, of the apparatus shown in FIG. 1;

FIG. 3 illustrates the use of the apparatus shown in FIGS. 1 and 2 for installing a wheel cover onto the rim of an automobile wheel; and FIG. 4 is a sectional view taken along line IV—IV of FIG. 3.

In FIGS. 1 and 2, there is illustrated the preferred form of apparatus according to the present invention which includes a casing 10 constructed to take the form of a sac-like enclosure wherein a compartment 12 contains a filling of material 14. The material used to form the casing can be selected from many presently-available materials including heavy canvas, vinyl, leather or the like. The filling material 14 is preferably sand or other finely-divided substances. The casing defines a bottom surface area 16 which is brought into contact with a wheel cover. A top surface 18 of the casing forms a force-receiving area that is preferably slightly larger than the palm area of the human hand. The boundary edges of area 18 preferably define an ellipsoidal shape. Preferably, the maximum overall length of the sand-filled casing is about 7 inches and the maximum overall width is about 5 inches. The thickness or height of the casing in the state as shown in FIGS. 1 and 2 is of the order of 2½ to 3 inches. To provide an effective impact force, the weight of the casing together with the filling of sand is about 5 pounds and it is preferred to utilize at least 3 pounds of sand. Surface 18 is preferably comprised of the same material as the remaining parts of the casing; however for manufacturing purposes and dimensional stability, it is preferred to include a stiffener sheet 20 made of semi-rigid plastic material beneath the covering forming surface 18. Typically, the casing will be sewed about the peripheral edge at the site of the stiffener sheet. A strap 22, made from the same material as the casing, is attached at its opposite ends, as shown in FIG. 1, to respective sides of the surface area 18. The strap 22 is used to provide an effective means for retaining the casing and particularly, the force-receiving area, against the palm portion of the user's hand. The parts described thus far form an impact force-distributing apparatus identified by reference numeral 24 which is supported on the user's hand in the manner clearly illustrated in FIG. 3. It will be observed that the force-receiving area 18 contacts the palm portion of the human hand including the inside surfaces of the forefingers.

Before describing the use of the device of the present invention, reference is made to FIGS. 3 and 4 wherein there is illustrated a pneumatic tire 26 of the type which is generally well known in the art. The tire is supported by a rim 28 which typically forms part of an automobile wheel. A hub cap 30 typically forms the wheel cover removably supported by the rim of the wheel in any one of numerous and well-known manners, one of which is typically illustrated in FIG. 4. The wheel cover is installed and retained onto the rim of an automobile wheel by elastic deformation of one, but usually a plurality of, elastically-yieldable friction support surfaces such as spring clips 32. The spring clips are attached to the inside surfaces of the wheel cover at each spaced-apart peripheral locations about the wheel cover. Spring clips are not used on some wheel covers as is well known in the art but, instead, the wheel cover itself includes a bent lip portion at the inside surface that is yieldable by a springing of the entire rim section of the wheel cover upon passage beyond circumferentially-spaced raised surfaces on the rim of the automobile wheel.

The apparatus of the present invention is employed for installing a wheel cover by arranging the wheel cover into an approximate installation site therefor at the rim of an automobile wheel which is best shown in FIG. 4. The wheel cover is held in this position by one hand of the installer or some other person. The apparatus 24 is positioned onto the hand of the installer as shown in FIG. 3 and described previously. The installer then moves surface 16 of the apparatus 24 into contact with a selected surface area of the wheel cover such that the casing strikes the wheel cover under a sufficient force to cause elastic yielding of a friction support surface, e.g., an elastic yielding of spring clip 32. At the same time, the flexible casing undergoes elastic deformation and the material in the compartment thereof undergoes a redistribution, whereby the surface area 16 conforms to the area of impact with the wheel cover. The apparatus 24 is moved by the user's hand by a generally-swinging motion and one or more striking blows may be delivered at selected surface areas about the rim of the wheel cover to insure a uniform seating of the cover onto the rim.

Thus, the apparatus of the present invention is compliant to distribute an applied impact force over an area typically of approximately 30 square inches of a wheel cover. The apparatus not only avoids the tendency to cause denting of the wheel cover but also the pliable material of the casing avoids abrasion upon contact with the wheel cover. Moreover, it is equally significant that the device of the present invention prevents injury to the installer's hand. The apparatus effectively prevents the tendency of spring clips with tongue-engaging surfaces to spring away from the rim of an automobile when the cover is struck by the apparatus. When striking the wheel cover with the apparatus, there is almost no elastic rebound.

Although the invention has been shown in connection with a certain specific embodiment, it will be readily apparent to those skilled in the art that various changes in form and arrangement of parts may be made to suit requirements without departing from the spirit and scope of the invention

I claim as my invention:

1. An apparatus to distribute an impact force along a selected surface, comprising:
    a semi-rigid stiffener sheet having an exposed surface and an unexposed surface;
    a deformable casing secured at its periphery to said stiffener sheet;
    said casing and the said unexposed surface of said stiffener sheet defining an enclosure;
    finely divided solid material filling said enclosing;
    retaining means secured to the said apparatus to retain the said exposed surface against the hand of a user of the apparatus.

2. Apparatus to distribute an impact force along a selected surface area of a wheel cover or the like for installation on to the rim of an automobile wheel, said apparatus comprising the apparatus defined in claim 1.

3. The apparatus of claim 1 where the said finely divided solid material includes sand.

4. The apparatus of claim 1 wherein said retaining means is a strap attached at its opposite ends to said casing.

5. The apparatus of claim 1 wherein said stiffener sheet is ellipsoidally shaped.

6. The apparatus of claim 1 wherein said finely divided solid material weighs at least three pounds.

* * * * *